Oct. 24, 1933.  O. U. ZERK  1,931,945

SPRING EYE JOINT

Filed March 30, 1931  5 Sheets-Sheet 1

INVENTOR.
Oscar U. Zerk
BY
Slough + Canfield
ATTORNEYS.

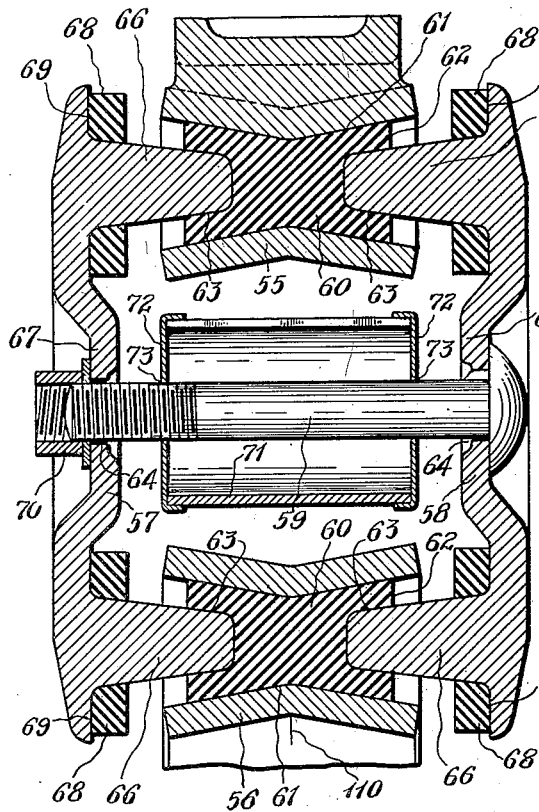
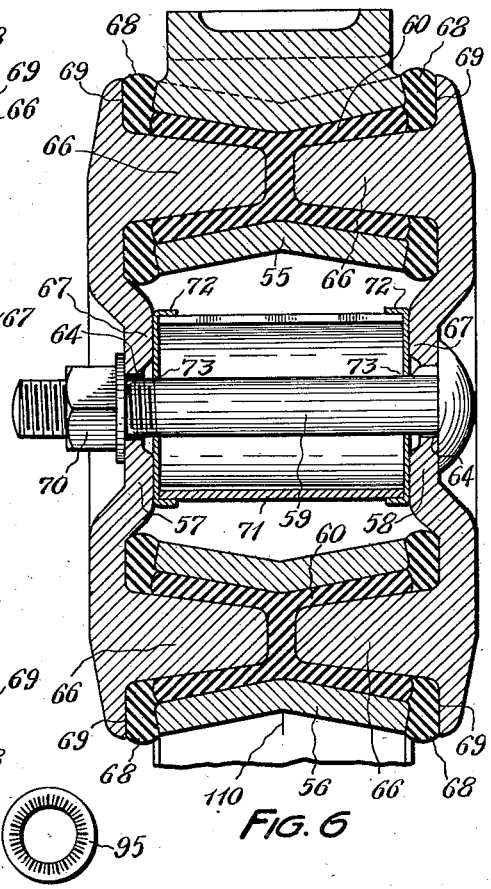
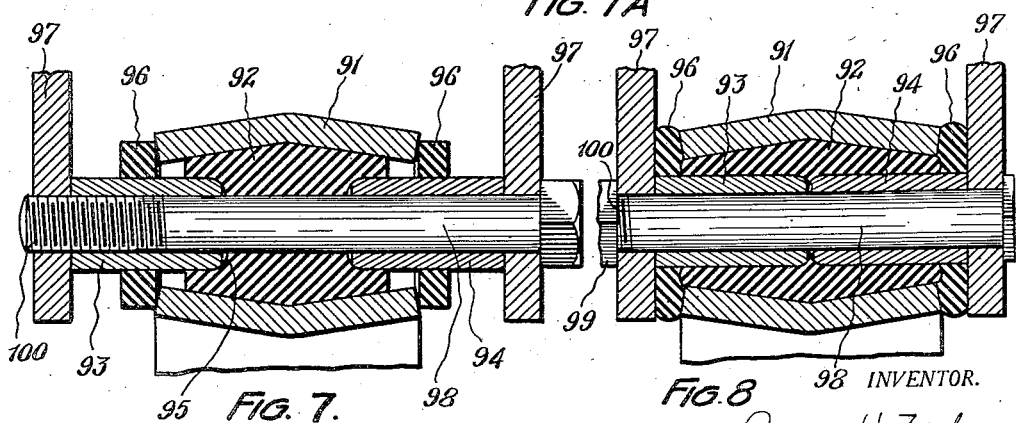

Oct. 24, 1933.    O. U. ZERK    1,931,945

SPRING EYE JOINT

Filed March 30, 1931    5 Sheets-Sheet 3

INVENTOR.
Oscar U. Zerk
BY Slough + Canfield
ATTORNEYS.

Oct. 24, 1933.  O. U. ZERK  1,931,945
SPRING EYE JOINT
Filed March 30, 1931  5 Sheets-Sheet 4
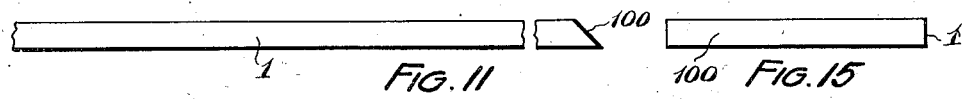
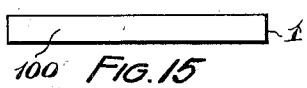
FIG. 11  FIG. 15
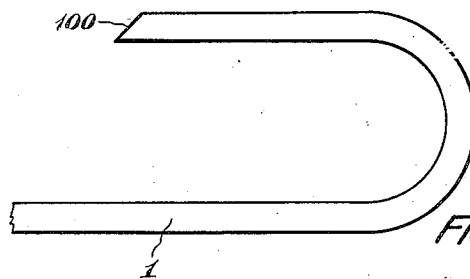
FIG. 12
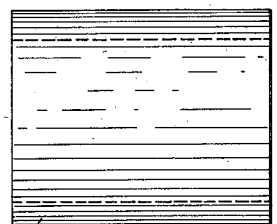
FIG. 16
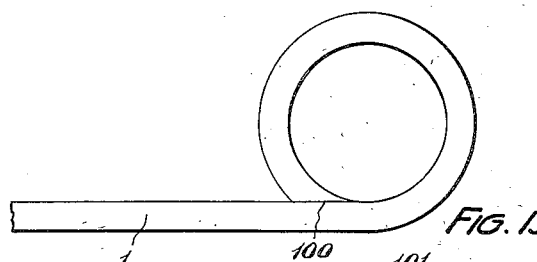
FIG. 13
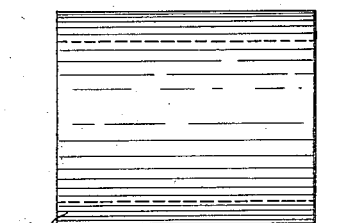
FIG. 17
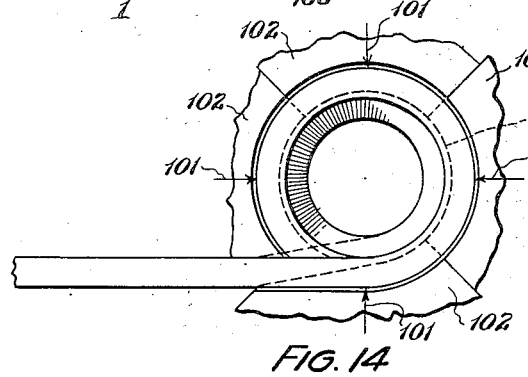
FIG. 14
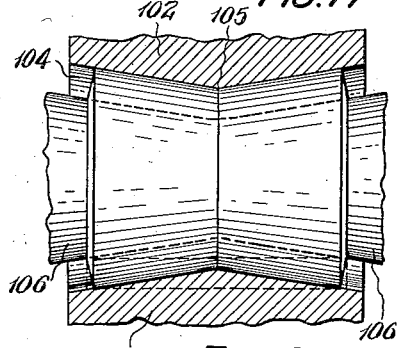
FIG. 18
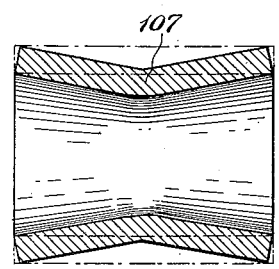
FIG. 19
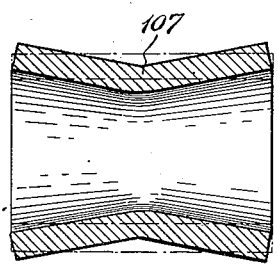
FIG. 20
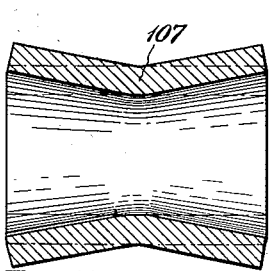
FIG. 21
INVENTOR.
Oscar U. Zerk
BY Slough + Canfield
ATTORNEYS.

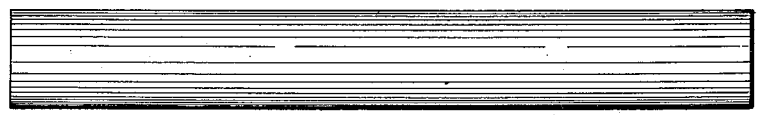
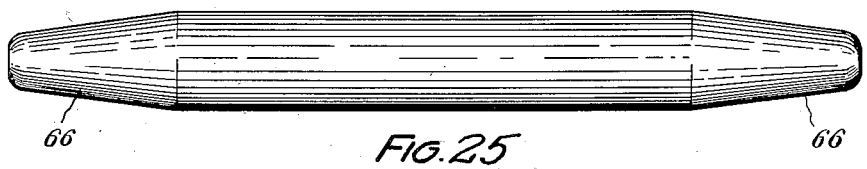
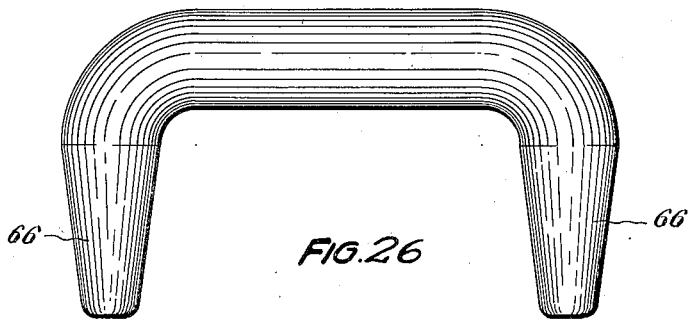
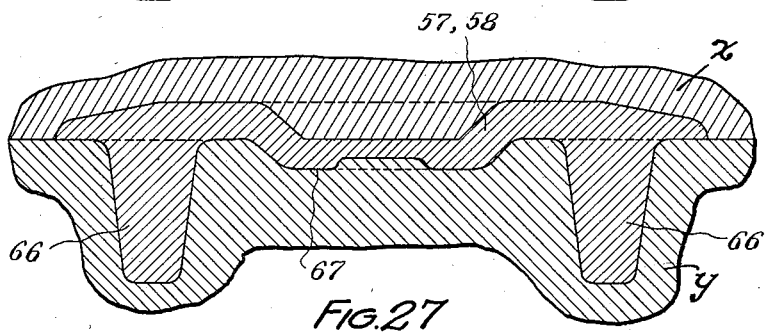
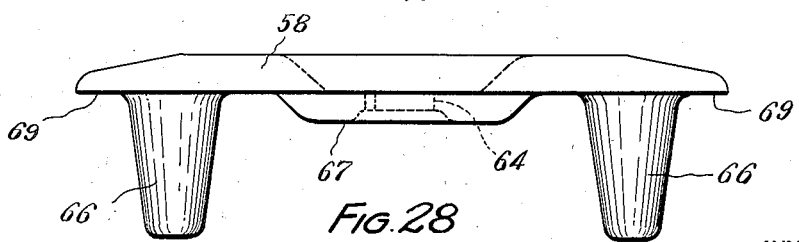
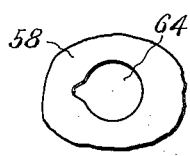

Patented Oct. 24, 1933

1,931,945

UNITED STATES PATENT OFFICE 1,931,945

SPRING EYE JOINT

Oscar U. Zerk, Cleveland, Ohio

Application March 30, 1931. Serial No. 526,183

5 Claims. (Cl. 267—54)

My invention relates to spring eye joints, of the type wherein a resilient cushioning element is interposed between inner and outer parts of the joint, and in certain aspects it relates more particularly to an improved construction of spring eye for the main leaf spring of a vehicle such as an automobile.

In current automobile spring construction, the spring eyes are usually formed integrally with the main leaf of the spring at the ends thereof, by so bending the ends of the spring as to form a tube, the axis of which extends transversely to the spring, into which a thin metal bushing and a spring bolt are successively telescoped.

The tubular spring eye, of course, is of open seamed construction, and the tubular bore thereof being relatively small, the spring eye is of considerable strength and is not readily opened incidental to the shocks and vibrations resulting from the use of the automobile served by the spring.

The modern trend in automobile design is to use in place of a lubricated spring bolt, a rubber bushing composed of an outer metal tube, a rubber tube and an inner metal tube or of a rubber tube of substantial size placed between the spring eye and the spring bolt.

The use of such a rubber tube necessarily increases the required inside diameter of the spring eye to about twice the diameter. It is known in the art of spring making that increasing the inside diameter of an open seamed spring eye decreases the strength of the spring eye, so that the spring eye is susceptible to opening responsive to road shocks, causing rattling noises, excessive wear and great danger of breaking or entirely snapping off the spring eye from the spring.

In order to overcome these difficulties, the extreme end of the flat spring is sometimes bent sharply and riveted to the spring. This method is very expensive and had the additional disadvantage on account of the sharp bend in the spring which is curved at the inside, due to the thickness of the leaf, that a very large longitudinal groove is left in the bore of the spring eye.

Another way to make the spring eye stronger is to make the top leaf of the cantilever spring of heavier size. However, this results in unduly increasing the expense of providing the heavier spring and at the same time the spring is less resilient and therefore less desirable for functional reasons.

In the present invention, I provide a very strong spring eye for a leaf spring without the necessity of riveting and without using a heavier spring thickness. This is accomplished by progressively varying the diametrical dimensions of the spring eye proceeding from its mid portion toward its ends and I thereby accomplish the very desirable result that of securing a much stronger spring eye for a given spring thickness or if desired considerably thinner leaf springs may be employed for a given spring eye strength.

In the following specification I disclose spring eyes formed with enlarged ends and others having enlarged mid portions. In the former types the rubber bushing elements are assembled into the spring eyes during the assembling operations of the vehicle employing the spring. In some cases as will be later shown, two separate rubber cushioning elements are usually inserted in the outwardly flaring types of spring eyes, from the two ends of the eye inwardly, being later compressed and in other cases a single block of rubber is first inserted as a unit before the compressing operation.

In the spring eyes of my invention wherein the spring eye diameters are decreased toward the ends, I sometimes provide the spring eye end portions with short cylindrical portions, whereby a preassembled multi-tubular cushioning element of any well known form employing outer and inner metal tubes and an intermediate rubber tube compressed therebetween may be forced into position within the spring eye being tightly fitted within the said cylindrical portions.

The novel forms of spring eye employed in my present invention, therefore, lend themselves to the solution of the problem of providing a stronger spring eye for a given thickness of spring and also to providing rubber cushioning joints for spring eyes which are relatively inexpensive to assemble and which may be assembled during the assembly operation of the motor vehicle parts.

The double conical form of the spring eye bore lends itself to the ready endwise insertion of tubular rubber cushioning elements from the two ends of the eye as an operation preliminary to the assembling of the oscillatable joint elements of the vehicle chassis and spring eye, as will more fully appear from the following description of certain embodiments of my invention.

Also, I suitably form the rubber cushioning element so that during the final assembly operation involving compression of the cushioning element, the rubber material while maintained under compressive stress will be forced to flow in a limited predetermined uniform manner. Thus, in those embodiments of applicant's invention employing the double conical form of spring eye bore, the rubber material is placed under both lateral and radial compressive stress, and will flow along the generally conical walls of the spring eye to occupy approximately all of the space between the two relatively oscillatable joint parts.

An object of my invention is to provide an improved leaf spring construction wherein a very strong tubular spring eye is provided in a manner not requiring securing of the extreme end of the spring to the spring, by riveting or otherwise and without requiring that the spring be of increased thickness.

Another object of my invention is to provide an improved integrally formed eye for a vehicular leaf spring.

Another object of my invention is to provide an improved method of making the spring eye referred to in the foregoing objects.

Another object of my invention is to provide a relatively more resilient main leaf spring for a given strength of spring eye therefor.

Another object of my invention is to provide an improved cushioning joint for relatively oscillatable parts of a mechanism.

Another object of my invention is to provide an improved cushioning joint for relatively oscillatable parts of an automotive vehicle one of said parts being the eye of a supporting leaf spring thereof.

Another object of my invention is to provide an improved cushioning joint for relatively slightly oscillatable parts of a mechanism comprising an inherently yieldable rubber cushioning element which may be assembled into a tubular eye of one of the mechanism parts, directly on the mechanism without a previous assembling operation of the joint parts per se, before application to the mechanism.

Another object of my invention is to provide an improved shackle for spring shackle mechanisms.

Another object of my invention is to provide a new method of making spring shackles.

Another object of my invention is to provide an improved cushioning joint for relatively oscillatable parts of a mechanism which may be very inexpensively assembled into the mechanism.

Another object of my invention is to provide an improved cushioning joint for resiliently interconnecting the eye of a spring of an automotive vehicle to the frame of the vehicle comprising an improved hanger and joint means associated therewith, whereby clamping pressure exerted upon the parts of the joint means and hanger will not distort the arms of the hanger.

Another object of my invention is to provide a highly efficient cushioning joint for relatively oscillatable parts of mechanisms.

Another object of my invention is to provide an improved shackle construction for automotive vehicle springs and the like.

Other objects of my invention and the invention will become more apparent to those skilled in the art to which my invention appertains by reference to the following description of certain embodiments of my invention which are illustrated in the accompanying drawings wherein:—

Figs. 5 and 6 are transverse sectional views of a cushioning shackle joint mechanism which is another embodiment of my invention, Fig. 6 showing the assembled mechanism, and Fig. 5 showing the parts thereof approaching the assembled condition;

Figs. 7 and 8 are views respectively corresponding to Figs. 5 and 6 of a cushioning joint mechanism which is another embodiment of my invention, Fig. 7 showing the parts thereof approaching their assembled condition, and Fig. 8 showing the parts in their relatively fully assembled condition;

Fig. 7a is an end view of the compression elements of Figs. 7 and 8;

Figs. 11, 12, 13 and 14 are side elevational views illustrating successive steps of operation involved in forming a spring eye which embodies certain principles of my invention;

Figs. 15, 16, 17 and 18 are end elevational views of Figs. 11 to 14 inclusive, respectively;

Figs. 19, 20 and 21 illustrate in transverse section three variants of the method generally illustrated in Figs. 11 to 14 inclusive;

Figure 22:
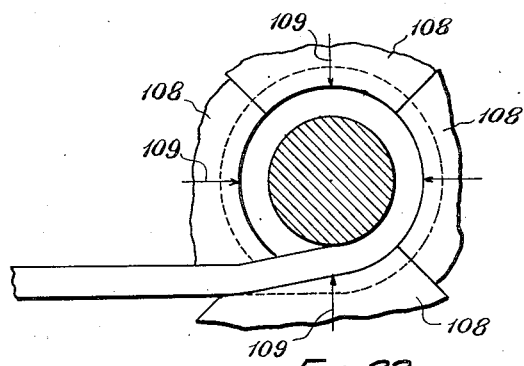
Figure 23:
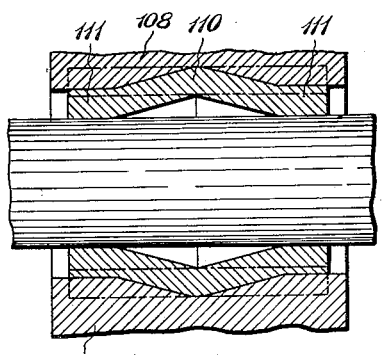
Figure 9:
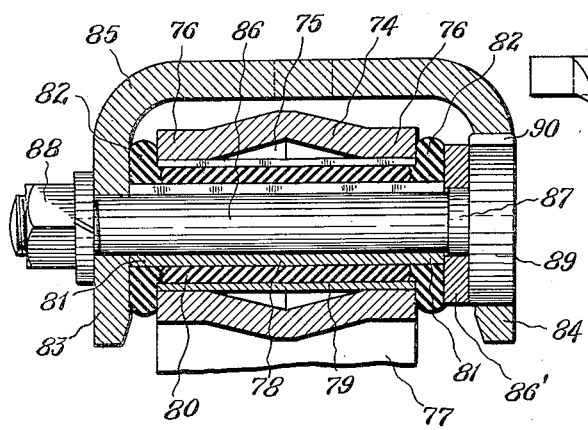
Fig. 9 is a transverse sectional view and Fig. 10 is a side elevational view of a cushioning hanger joint mechanism for leaf springs which is another embodiment of my invention.
Figure 10:
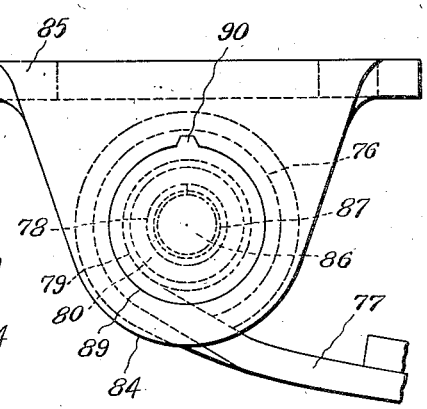

Figs. 22 and 23 respectively show in side elevation and in transverse section a method variant to that of Figs. 11 to 14 inclusive, and Figs. 15 to 18 inclusive, and also Figs. 19 to 21 inclusive, but also embodying certain principles of my invention, Fig. 23 also illustrating the resultant form of spring eye, which is elsewhere illustrated in Figs. 9 and 10.

Figs. 24 to 29 inclusive are views illustrating successive steps of process involved in the making of shackle elements such as may be employed in the form illustrated in Figs. 5 and 6.

Figures 1, 2:
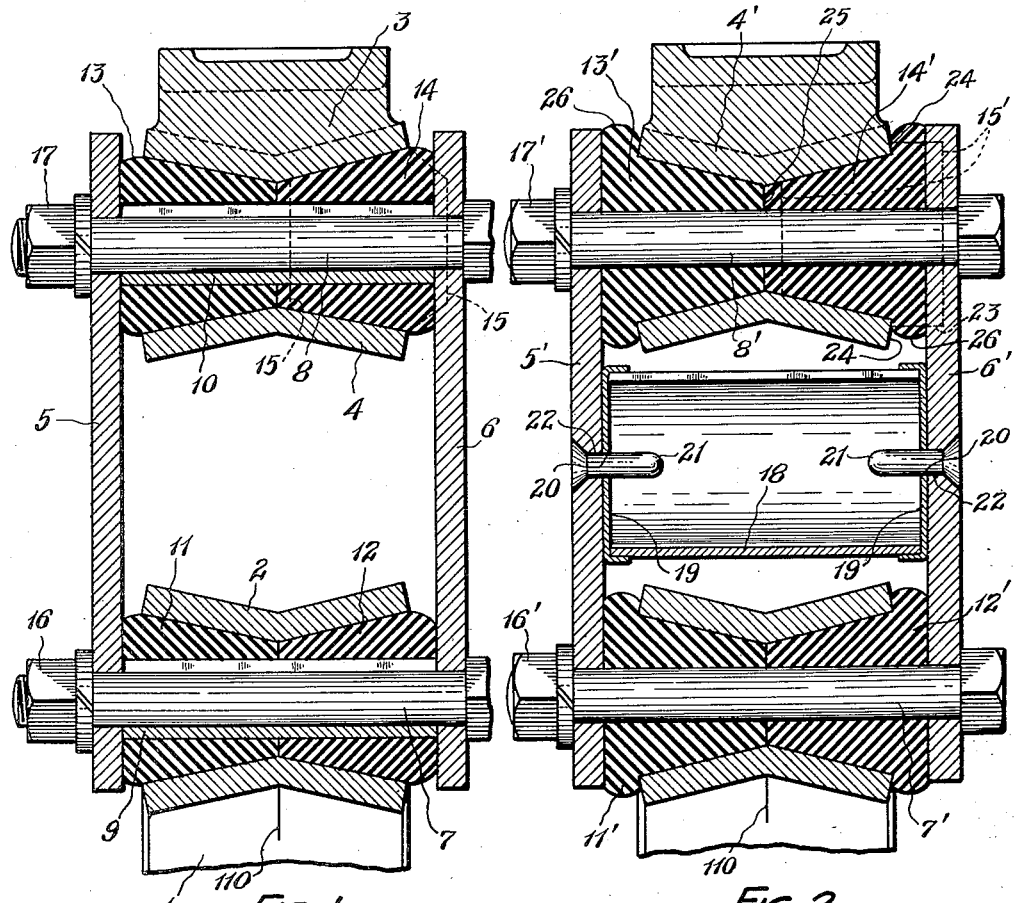
Fig. 1 is a transverse sectional view of a cushioning shackle joint mechanism for vehicle springs embodying the principles of my invention.
Fig. 2 is a view similar to that of Fig. 1, but of a shackle mechanism which is another embodiment of my invention.

Referring now first to the embodiment of my invention illustrated in Fig. 1, at 1 I show the end of a main leaf of a spring which terminates in a tubular eye 2, integrally formed with the body of the spring 1, the eye providing a tubular bore extending transversely to the spring and of progressively increased diameter towards each end of the bore from the middle of the spring. Therefore the bore of the tubular spring eye is relatively restricted at its midportion, but is of increased diameter toward both of its ends as shown.

I show the end of a main leaf of a second leaf spring terminating in a spring eye 4 like that of the spring eye 2 as above described. The springs 1 and 3 are required to be interlocked by shackle bars 5 and 6 and to accomplish such function parallel spaced shackle bolts 7 and 8 extending through spaced apertures in the shackle bars 5 and 6 extend between said bars, each axially within the bore of separate of the spring eyes 2 and 4. Preferably seamed tubes 9 and 10 tightly fitted over the bolts 7 and 8 respectively serve as spacers between the shackle bars 5 and 6.

The tubes 9 and 10 are preferably longer than the length of the tubular spring-eyes 2 and 4 and the space between the interior walls of the spring eyes and the outer surfaces of the tubes 9 and 10 is occupied by tubular rubber cushioning elements, 11 and 12 for the spring eye 2 and 13 and 14 for the spring eye 4. The tubular rubber cushioning elements 11 to 14 inclusive are of like form and before inclusion in the cushioning joint mechanism as illustrated have the normal form substantially as indicated by the dotted lines at 15.

Also the dotted lines illustrate for the cushioning element 14 its position relative to the bore of the spring eye 4 before being forced inwardly by the effect of turning the nuts 16 and 17 on the bolts 7 and 8 respectively to bring the shackles 5 and 6 to their ultimate relative positions rigidly against the annular ends of the two metal tubes 9 and 10 as shown.

By reference to the solid lines illustrating the ultimate form and position of each of the cushioning elements relative to the dotted lines, such as 15, showing the preliminary position and form of one of such elements, the change in form of the elements relative to the compressive effect of the bolting operation, above referred to will be readily understood.

Rubber is a relatively incompressible material and upon compressive stresses being exerted thereon the rubber will tend to flow in directions where the compressive stresses are absent or prevalent to a less degree, consequently when the bolting operation is effected, the rubber cushioning elements will move inwardly until the inner ends of two longitudinally aligned of said elements over the same bolt meet at the midportion of the spring eye.

Meanwhile during the bolting operation, the walls of the spring eye bore being inwardly converging toward the center of the spring eye will exert more and more compressive effort upon the outer surface of the cushioning element with the result that the free portions of the rubber intermediate the ends of the spring eyes and the shackle arms will bulge in a radial direction as shown.

The tubular metal spacers 9 and 10 limit the amount of the compressive action effected upon the rubber elements and together with the bolts and the shackles form a relatively rigid rectangular frame for the shackle mechanism, firmly joining through the interposed rubber elements the two spaced spring eyes.

The compressed rubber elements will exert such a sufficient pressure against the confining walls of the spring eyes and the outer cylindrical walls of the tubes 9 and 10 that the frictional contact had therebetween will prevent relative rotation of the contacting parts of the rubber and metal referred to.

Therefore, such relative movements of the spring eyes as occurs in practice tending to rotate the eyes and the shackle bolts associated therewith, will only serve to effect a yielding of the rubber material disposed therebetween according to the now well known mode of rubber cushioned joints of this general character.

It is important to note that the preliminary form of each of the four rubber cushioning elements 11 to 14 inclusive before compression, as indicated by the dotted lines 15, is such that before the shackles exert any pressure on the loosely inserted cushioning elements, that the cushioning elements preferably make a good fit with the opposing surfaces of the spring eye inner walls and the cylindrical outer surfaces of the spacer tubes 9 and 10.

This results in the advantage that the cushioning elements respond to the pressure exerted by the shackles during the bolting operation to move into the tapered eye bore portions, to the ultimate positions as illustrated in Fig. 1 by the solid lines without any irregularity or irregular distortion resulting from a greater binding effect on one side of any tubular cushioning element relative to its other side.

Referring now to the embodiment of my invention illustrated in Fig. 2, it is to be noted that in the shackle joint mechanism illustrated therein, the pair of tubular spacers 7 and 8 of Fig. 1 are omitted being replaced by a single tubular spacer 18 of greater diameter provided with end caps 19, each of which is provided with a central opening 20 to admit positioning pins 21 which are tightly driven into place within openings 22 through the midportion of the hanger 5' and 6'. The pins and end caps are principally for the purpose of holding the tube 18 in position until the nuts 16' and 17' are turned tightly on the shackle bolts 7' and 8', and thereafter the great pressure exerted by the two shackles against said end cap and communicated to the end of the tube 18 will firmly hold it in place, the tube 18 with its end caps effecting the spacing function for the shackles 5' and 6' in a manner similar to that referred to as being performed by the spacing tubes 9 and 10 of the embodiment shown in Fig. 1.

In connection with the embodiment of Fig. 2 I have illustrated a slightly variant form of rubber cushioning elements at 11' to 14' inclusive, wherein the cushioning elements are given the preliminary unstressed form indicated by the dotted lines 15' wherein a circumferential flange shown more particularly at 23 is provided at the outer end of the cushioning element, and which being compressed between the end edges, such as 24 of the spring eye, such as 4' and the shackles such as 6' to force the inner end edge, such as 25 to abut with the like inner end edge of the opposing cushioning element 13' at the middle of the spring eye bore, the rubber material of the flange is forced to flow outwardly to an amount such as is indicated by the solid lines 26, forming a spaced flange portion of the rubber cushioning element interposed between the ends of the spring eye and the shackles.

I find that the provision of such a cushioning spacing flange improves the action of the cushioning element of the joint to a marked degree.

Otherwise the structure shown in Fig. 2 will be understood from the foregoing description of corresponding structure of Fig. 1.

Figures 3, 4:
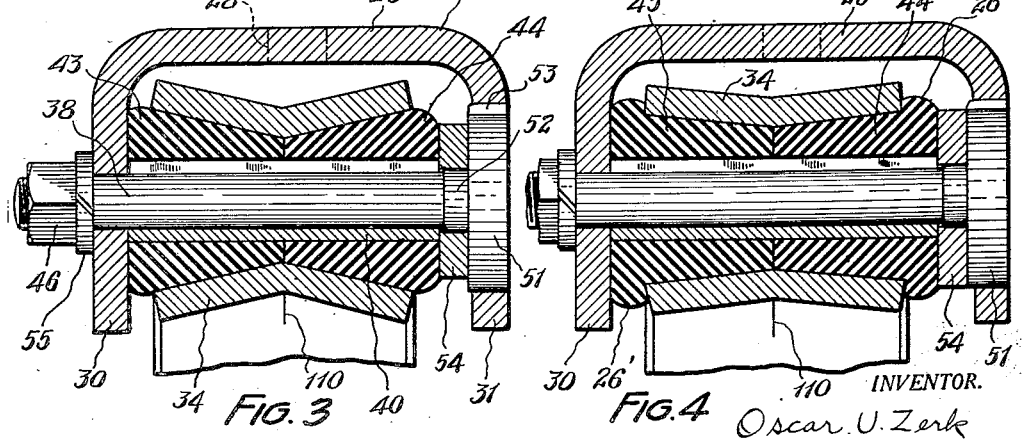
Figs. 3 and 4 are transverse sectional views of cushioning hanger joint mechanisms for vehicle springs in which some of the improvements of Figs. 1 and 2 are respectively incorporated, and which represents other embodiments of my invention.

Referring now to Fig. 3, a spring hanger 27 of an automotive vehicle bolted to the chassis frame thereof as by bolts projected through apertures such as 28 thereof is illustrated being preferably of a U-form having a central yoke 29 and a pair of parallel spaced pendant apertured arms 30 and 31 respectively, the spring eye 34 formed like the described spring eyes 2 and 4.

The rubber cushioning elements 43 and 44 are loosely placed in the bore of the spring eye with their smaller ends disposed inwardly in the manner illustrated by the dotted lines 15 of Fig. 1 of the cushioning element 14.

Then the spacing tube 40 formed like the spacing tube 10, Fig. 1 is projected through the aligned bores of the rubber cushioning elements 43 and 44.

The spring eye with the partially inserted cushioning elements 43 and 44 and the interiorly telescoped spacing tube 40 is then bodily moved into the space between the two hanger arms 30 and 31, the enlarged ends of the rubber cushioning elements then projecting outwardly beyond the ends of the tube 40, but not so far as to prevent the placement of the assembled eye and cushioning element parts between the hanger arms 30 and 31.

The clamping bolt 38 employed in the hanger embodiment of Fig. 3 comprises an intermediate stem portion, whose end is threaded for the reception of a clamping nut 46, the other end provided with an integral head 51 of relatively large diameter and an intermediate neck 52 somewhat greater in diameter than the stem 38, the head being preferably provided with a locking projection 53 at a point on its perimeter.

The spring eye is of the tubular form like the spring eye 4 previously described, with its walls converging inwardly to the middle portion.

The pendant arms 30 and 31 of the hanger are both perforated. The first with a relatively small opening of a diameter merely sufficient to receive the stem of the bolt 38 therethrough, the arm 31, however, being provided with an opening of relatively large diameter having a locking groove in its border portion adapted to be interfitted with the locking projection 53 of the enlarged bolt head 51, when the bolt is projected through the said enlarged perforation and axially through the tube 40 and the perforation of the hanger arm 30 which operation preferably follows those previously described, but only after an annular metal washer 54 has been telescoped over the stem of the bolt to a snug fitting seat on the bolt neck 52.

Assembly of the parts is completed by preferably placing the lock washer 55 in place as shown and then turning the nut 46 on the threaded end of the bolt 38 projecting through the hanger arm 30 to a "home" position, wherein the bolt head 51 by the intermediate metal washer 54 tightly clamps the spacing tube 40 by its ends, against the inner surface of the hanger arm 30, meanwhile exerting longitudinally applied compressive force on the enlarged ends of the rubber tubes 43 and 44 to force them inwardly within the spring eye opening so that their inner reduced ends are preferably in substantially abutting relation, as shown.

The inwardly tapered ends of the rubber tubes which form the cushioning elements of the present embodiment are directed by the tapering walls of the spring eye 34 and the cylindrical outer walls of the spacing tube 40.

As described for the rubber cushioning element 14 of Fig. 1, the cushioning elements 43 and 44 are deformed during the compressing operation above described from their normal form indicated by dotted lines 15, Fig. 1, until they take the forms shown in Fig. 3.

It is to be noted that the embodiment of my invention shown in Fig. 3 is similar in some respects to cushioning joints for hangers and the like described and claimed in my co-pending application, Serial No. 518,369, filed February 26, 1931 to which reference may be had for fuller description as to common features of construction and motive operation. It is to be noted that the assembled joint comprises the spring supported parts 40, 43 and 44 tightly clamped by the bolt 38 against the hanger arm 30 and that the head 51 of the bolt makes a longitudinally sliding bearing engagement only with the wall surfaces of the aperture through the hanger arm 31, but is supported by the hanger arm 31 for all stresses exerted on the bolt in directions radial thereto, the projections 53 of the bolt head being interlocked with a groove of the said hanger arm aperture wall surface to prevent relative rotation of the bolt to the hanger. Preferably the spacer tube 40 is of seamed construction for reasons more fully related in my above identified co-pending application.

Although in the embodiments as illustrated in Figs. 1 and 3 and elsewhere herein, I depend upon frictional pressure engagement between the rubber cushioning elements and the hanger eye and spacer tube surfaces to prevent slipping of the cushioning elements on the engaged named metal surfaces.

I may sometimes unite the engaged surfaces of rubber and metal as by vulcanizing or the like or interlock them by grooving or serrating the engaged metal surfaces as described in my said co-pending application. The spacing tube 40 performs the same function as the tubes 9 and 10 of Fig. 1 and the tube 18 of Fig. 2 in that it positively limits the inward movement of the cushioning element compression applying parts, in this case the hanger arm 30 and the bolt head washer 54, to a predetermined ultimate spacing, previously preferably experimentally determined to be best suited for the particular rubber cushioning elements used in connection with the given spring eye opening and spacing tube employed.

The embodiment of my invention illustrated in Fig. 4 requires little description in view of the foregoing, insofar as the parts described in connection with Fig. 3 are substantially like those of Fig. 4, except that in Fig. 4 instead of cushioning elements formed like that indicated by dotted lines 15 for the cushioning element 14 of Fig. 1, also employed in Fig. 3, the variable form of cushioning element indicated by dotted lines 15', in Fig. 2 and having the preformed head flange 23 is illustrated in the embodiment of Fig. 4, which when pressure is applied in the manner readily understood by reference to Fig. 3 to the ends of the rubber cushioning elements 43' and 44' causes these elements to have their tapered ends projected inwardly to abutting relation mid-way of the eye opening and also causes a slight radial flow of the rubber material thereof to form the radially extending rubber flange portions 26' interposed between the end edges of the spring eye and the clamping elements, which in this case comprise the hanger arm 30 and the metal washer 54 forced inwardly by the bolt head 51 in the previously described manner.

Referring now to Figs. 5 and 6, another embodiment of my invention is illustrated thereby, comprising a shackle mechanism preferably employing spaced leaf spring eyes 55 and 56 having the same forms as those previously described in connection with the foregoing embodiments. Into each of these spring eyes a block of rubber 60 is forced, the rubber block initially having its outer peripheral walls 61 of the same form and dimensional characteristics as the inner wall surfaces of the spring eyes, the ends 62 being planular except that centrally each end is provided with a recess 63 extending inwardly or perhaps one-half the distance from the annular planular wall portion 62 to the middle portion of the rubber body which incidentally is of least diameter.

Fig. 5 shows the rubber bodies which form the cushioning elements of this embodiment of my invention in substantially their normal form or at least but slightly departing therefrom. Fig. 5 illustrates other parts not yet named, but including shackle elements 57 and 58 and associated parts ready to be operated upon to effect assembly of the various elements of the shackle mechanism, whereas Fig. 6 shows the parts completely assembled. After the rubber cushioning elements 60 are positioned in the spring eyes their polar recesses 63 are disposed co-axially within the tubular spring eye and presented toward either end thereof.

57 and 58 illustrate substantially like shackle elements each comprising inwardly projecting portions 67, which are centrally apertured at 64 to receive the shackle bolt 59, shown in place ready to perform its clamping function, later described. Each of the shackles also comprises a pair of like tapered posts 66, which are relatively spaced according to the desired spacing of the spring eyes and are positioned to project inwardly into the different polar recesses 63 of the two rubber cushioning element bodies 60 into which their ends normally readily fit, as illustrated in Fig. 5.

Each of the shackles 57 and 58 of Figs. 5 and 6 are of novel form consisting of a pair of posts 66, each of which take the place of half of a spring bolt, integrally formed with an intermediate supporting shackle portion, which is centrally channeled to increase the rigidity of the shackle.

The integrally formed shackle and half bolt elements are preferably made first by cutting off a certain length of a round bar, then coning both ends thereof to provide the posts 66, then bending the bar to substantially U shaped form, and then upsetting the material adjacent the bases of the posts 66, so as to provide a flange head for each post and to provide the centrally disposed channel shaped recess portion intermediate the bolts, which is centrally apertured at 64 intermediate the bolts, the shackle portion being also flattened as shown.

I have illustrated the successive steps of operation involved in the making of the shackles, successively in Figs. 24, 25, 26, 27, 28 and 29, wherein Fig. 24 shows the cylindrical rod, the ends of which are tapered to the form shown in Fig. 25, and then by a bending operation the rod is made of substantially U-form.

Then by the compressive operation of a pair of dies, fragmentarily indicated at $x$ and $y$, in Fig. 27 exerted upon the interposed bent bar of Fig. 26, the bar is given the form shown in Fig. 28, the central portion thereof being then pierced as indicated at 64.

The center of the shackles are thus given a greater resistance against bending stresses than the end portions and the centrally depressed perforated portions of the shackles provide for the reception of the shackle bolt head and the nuts therefor positioned as shown in Figs. 5 and 6.

A very inexpensive rigid shackle construction is thus provided and wherein the separate posts 66 and 67 integrally formed with the shackles, perform the functions of shackle bolts, in conjunction with the single shackle bolt 59, which is thus not required to be projected through a spring eye with attendant disadvantages in the assembling operation.

Prior to the insertion of the ends of the posts 66 into the cushioning element recesses 63, there will be preferably positioned over each of said posts a rubber annulus 68, which is of suitable form as to fit onto the base portions of said posts and against the preferably planular annular face portions 69 bordering the post spaces.

Also, as shown in Fig. 5, I provide a spacing element consisting of a metal tube 71 which preferably may have a longitudinal seam, for purposes of economy in manufacture, provided with end caps 72 both of which are centrally apertured to permit the assembled tube and caps to be placed with the apertures 73 disposed in alignment with the shackle aperture 63 whereby the bolt 59 may be successively projected through all of said apertures to position the capped tube on the bolt between the shackles.

The parts above referred to then being positioned as shown in Fig. 5 and the shackle bolt 59 being projected successively through the aperture 64 as shown, the nut 70 is placed on the threaded end of the bolt and turned to its ultimate position as indicated in Fig. 6 to accomplish inward movement of the opposing pairs of tapered arms 66 to displace the rubber material of the blocks 60 longitudinally outwardly toward the ends of the spring eyes until sufficient of the rubber material 60 has been displaced to substantially entirely fill the space in the spring eye disposed intermediate the eye walls and the opposing surfaces of the arms 66. At this time the ends of each joined pair of arms 66 approach quite closely to the opposing ends of the other pair of like joined arms and the rubber material flowing from the space disposed intermediate the arms is compressed therebetween and between the lateral surfaces of the arms and the inner walls of the eye opening.

Turning of the nut 70 on the bolt 59 also ultimately brings the rubber washers 68 into compression to fill the space between the ends of the spring eye and the rubber cushioning element 60 substantially flush therewith, and the annular substantially planular surfaces such as 69 of the shackles which surround the bases of the arms 66.

Also, compression of the washers 68 tends to cause the rubber material of the washers to flow radially, to cause them to take the forms shown in Fig. 6, as distinguished from their initial forms shown in Fig. 5.

The home position of the nut 70 on the bolt is determined by the rigid engagement ultimately effected between the end caps 72 for the spacing tube 71 with the inwardly projecting portions 57 of the shackles. So far as all operative effects are concerned consequent to assembly of the cushioning washer 68 and cushioning element 60 are concerned, these washers and the main body portion of the cushioning element act as if they were originally made from one piece of rubber, being very intimately pressed together in their contiguous surfaces. In Figs. 9 and 10 I show another embodiment of my invention applied to a spring hanger mechanism wherein the spring eye 74 is formed somewhat differently from the spring eyes previously described, in that the middle portion 75 of the eye opening is of greater diameter and the walls of the spring eye being preferably characterized also by the provision of substantially cylindrical portions 76 at the two longitudinal ends of the eye. The eye is formed integrally with the spring 77 as in the foregoing embodiments. This form of spring eye, although not limited thereto, is particularly susceptible for use in connection with cushioning elements of the channel type shown in my copending application aforesaid, wherein the cushioning element per se comprises an inner metal tube 78, an outer metal tube 79 and an intermediate rubber tube 80 compressed between the metal tubes, the inner metal tube 78 being preferably thickest and longest to provide projecting ends 81.

The cushioning element may be supplemented as shown in Figs. 9 and 10 by rubber washers 82 whose purpose and function corresponds to the similar washers illustrated at 68 in the hanger mechanisms of Figs. 5 and 6.

The multi-tubular cushioning element per se aforesaid, is adapted to be press-fitted within the spring eye opening, the end portions of the outer metal tube 79 making press-fitted engagement with the inner surfaces of the substantially cylindrical end portions 76 of the spring eye walls. The spring eye, like the previously described embodiments, is made much stronger by making it of channeled form and by providing the substantially preferably cylindrical portions 76, good tight bearing contact may be had with the outer metal tube 79.

To assemble the mechanism, the spring eye with the interiorly telescoped multi-tubular cushioning element having the rubber washers 82 placed on the projecting ends 81 of the inner metal tube of the cushioning element is first moved to a position between the pendent arms 83 and 84 of the hanger 85, said hanger being formed like that described in Figs. 3 and 4, and in axial alignment with the bolt-receiving openings provided in said pendent hanger arms. The spring bolt 86 having preferably the same approximate form as that shown at 38 in Fig. 3, and preferably containing a metal washer 86 seated on the neck 87, is projected successively through the aperture of the hanger arm 84, then through the inner cushioning element tube 78 and through the smaller aperture of the hanger arm 83. The nut 88 is then turned onto the threaded end of the bolt and the enlarged head 89 with the metal washer 86 is drawn inwardly, being guided by the walls of the aperture of the hanger arm 84 to compress the rubber washers 82 until the spacing tube 78, which in this case is the inner tube of the multi-tubular cushioning element, is tightly clamped by its ends between said washer 86 and the hanger arm 83, whereupon the cushioning joint mechanism is entirely assembled with all of the parts in operative relation each to the other.

Relative rotation of the bolt and the hanger is prevented by the interlocking projection 90 of the bolt head entering a groove of the hanger arm recess wall as described in connection with Fig. 3.

In Figs. 7 and 8, the same type of channeled vehicle spring eye may be employed at 91, in a spring shackle mechanism or the like, in a manner involving some of the means and characteristics of the shackle mechanism of Figs. 5 and 6, but described therefrom as will be now related. Instead of a multi-tubular cushioning element being employed the embodiment of Figs. 7 and 8 employs a single integral block of rubber 92 which is first forced inwardly into the spring eye 91 in any suitable way. The rubber block 92 is in the form of a tube having a relatively small axial bore terminating in axial polar recesses and an outer peripheral surface which is of progressively increased diameter from the ends of the tubular rubber block to its middle portion. The said outer peripheral surface of the rubber block closely approximates in dimensional characteristics, those of the interior walls of the spring eye opening.

At 93 and 94 I show a pair of oppositely disposed axially aligned tubular metal compression elements for the rubber block 92 whose rounded blunt ends 95 are seized within the polar recesses thereof and on the outwardly projecting midportions of said tubular compression elements 93 are disposed a pair of rubber washers 96, one at each end edge of the spring eye.

The spring eye with its contained rubber insert 92 with axially projecting tubular compression elements 94 carrying the washers 96 are then shiftable as a unit to a position between the parallel arms 97 of a shackle or like mechanism sought to be resiliently coupled with the spring having the eye 91, whereupon through apertures of the arms 97 and through axially aligned bores of the compression elements 93 and 94 and of the intermediately disposed rubber body 92, the bolt 98 is projected and thereafter a nut 99 is turned onto the threaded end 100 of the bolt to tightly compress the parts in assembled relation as shown in Fig. 8, wherein the ends of the compression elements 93 and 94 are preferably brought into abutting relation. The rubber material of the body 92 is thereby displaced by extrusion from the central portion of the eye opening until the outwardly forced portions of the rubber reach the ends of the spring eye and engage by a pressure contact with the resiliently flattened rubber washers 96.

In this embodiment the compression elements 93 and 94 act first to produce a longitudinal thrust on the intermediately intervening portions of the rubber and then somewhat as wedges to displace the rubber outwardly.

As a further improvement, the ends 95 of the compression elements may be serrated as shown in Fig. 7a to provide a positive interlock between said compression elements to avoid relative rotational movements thereof.

The spring eyes previously described herein are preferably formed in the manner now to be described.

In the following description, it is to be understood that Figs. 11, 12, 13, 15, 16 and 17 relate to both types of spring eyes previously described, and Figs. 14, 18, 19, 20 and 21 relate particularly to the type of spring eye illustrated in Figs. 1 to 6 inclusive, and Figs. 22 and 23 are illustrative of a final step of process following those illustrated in Figs. 13 and 17 for that type of spring eye illustrated in Figs. 7 to 10 inclusive.

Referring now particularly to the spring eye employed in the embodiments of 1 to 6 inclusive, Figs. 11 and 15 show in side and end elevation, respectively, the end of a spring 1 having a terminal bevel 100; Figs. 12 and 16 show like views of the same spring end bent to U-form and Figs. 13 and 17 show the further bending of the spring end into a substantially completed annular loop wherein the end bevel 100 makes preferably close fitting engagement with the body of the spring leaf 1, said spring eye then being in the form of a substantially cylindrical tube.

The foregoing steps of process are those usually had in forming cylindrical spring eyes.

A preferred method of continuing the process previously described to forming spring eyes like those shown in Figs. 1 to 6 inclusive, is illustrated in Figs. 14 and 18 and Fig. 19 and consists in applying inward radial pressure directed as indicated by arrows 101 by means of a plurality of separate compression dies 102 having arcuate inner surfaces 103, the inner surface of said die elements being so formed that when they are simultaneously pressed inwardly to their ultimate positions as indicated in Figs. 14 and 18, they define a tubular opening 104 tapered inwardly from both ends to the middle 105, which is of least diameter.

Before moving the die elements 102 inwardly, the pair of cone-shaped mandrels 106 are inserted within the eye opening from the two ends thereof to resist undue deformation of the spring eye material by supporting the same.

When sufficient pressure is exerted to cause the dies to reach their ultimate positions indicated in Figs. 14 and 18, the spring material of the spring eye, as shown in Fig. 13 is deformed from the approximately cylindrical form therein to the ultimate form shown in the different Figures 1 to 6 inclusive, and in Figs. 14 and 18.

All of the above operations are preferably carried out with the spring material forming the eye sufficiently heated as to facilitate the forming operations described.

From the foregoing, it will be understood that the spring eye of cylindrical form, as indicated in Figs. 13 and 17 may be maintained to normal diameter at its ends with only the middle portion deflected inwardly as shown in Figs. 14 and 18, and 19, or by utilization of a two-part expanding mandrel, a reverse operation may take place, as shown in Fig. 1, wherein the middle portion 107 maintains its diameter and the portions nearer the ends are expanded progressively, or as in the case illustrated in Fig. 20 a combination of the two operations may be effected, wherein contracting dies as shown in Fig. 14 are utilized as shown in combination with inwardly disposed expanding dies to deflect the mid-portion of the eye inwardly and the end portions of the eye outwardly preferably simultaneously.

Referring now to Figs. 22 and 23 which illustrate the final operation relative to the making of the spring eye having the form illustrated in Figs. 7 to 10 inclusive, the operation is much the same except for differences in the forming of the exterior dies and interior mandrel.

Figs. 22 and 23 show the inwardly contracting compression dies 108 exerting inwardly directed radial force as indicated by the arrows 109 against the outer surface of the eye material and an inner mandrel limiting the inward movements of the eye material, the imposing surfaces of said mandrel and said die elements being such as to ultimately form the spring with an increased diameter at the middle 110 and tapering therefrom toward the ends of the spring eye opening, the end portions 111, however, being preferably cylindrical.

In connection with the operation, Figs. 22 and 23 the same variations may be accomplished as indicated in Figs. 19 and 21 previously described involving the use of an interiorly disposed expanding die in combination with either a rigid or a contracting die disposed exteriorly of the eye material.

These variations will be understood from the foregoing and a detailed explanation thereof, therefore, will not be necessary.

In the spring eyes described in the foregoing specification, I accomplished the result of providing a very strong spring eye formed integral with a main spring 1 of a vehicle, or the like, without riveting the end of the leaf to the body thereof, and without using heavy spring stock. This results because of the fact that both the outwardly flaring spring eye, shown in Figs. 1 to 6 inclusive and the outwardly reduced spring eye of Figs. 7 to 10 inclusive are of substantially channel form in the circumferential direction, and therefore unwinding of the loop forming the eye is practically made impossible. It is to be noted that as shown at 110, that I continue to a progressively reduced degree the channel form of the leaf spring forming the spring eye for a short distance along the leaf spring proper.

This transfers stresses from the spring eye to the flexible portion of the spring which otherwise might end to break the spring at the junction of the main spring portion and the spring eye.

In the embodiments of my invention shown in Figs. 1 to 4 inclusive, by virtue of the outwardly flaring spring eye construction, I accomplish a rubber receiving space wherein the substantially tapered rubber annuli, such as 11 to 14 inclusive and 11', 12', 13' and 14', may be forced inwardly to an ultimate home position, wherein said annuli are held tightly compressed in place and with their inner end edges disposed in an approximately radial plane.

The construction described provides a very efficient cushioning joint between the slightly oscillatable mechanical elements consisting for instance in Fig. 1 of the shackle frame, consisting of the parts 5 to 10 inclusive, and the spring eyes 2 and 3, without permitting an undue amount of relative lateral movement between said pairs of mechanical parts such as would introduce the undesirable so-called "shimmy" action, where the apparatus is installed on an automobile.

In the embodiments illustrated in Figs. 5 and 6, the rubber cushioning means disposed within the spring eye is slightly in the form of a unitary rubber block of generally hour-glass form, with substantially polar recesses, which extend about midway to the waist of the rubber body from each end thereof.

A rubber body so formed can be readily positioned within the spring eye tube whose bore is also of generally hour-glass form, even though the inner walls thereof are of substantially the same dimensions as the outer walls of the rubber body, by forcing the body endwise into the eye opening, since the foremost polar recess 63 permits the inward deformation of the outwardly flaring circumferential foremost end portions, until the foremost enlarged end portion has been projected past the reduced waist of the eye opening.

The compressive stress exerted by the shackle arms 66, the ends of two of which are projected into the oppositely disposed polar recesses of each said rubber body 60, upon the rubber body results from the direct compression of the rubber material between the ends of the arms, forcible displacement of portions of the rubber therefrom, and resultant displacement by said first displaced rubber portions of rubber portions disposed along the outwardly flaring walls of the spring eye, augmented by the inward projection of the tapered side walls of each of the arms 66.

The resultant form of the rubber body 60, as illustrated in Fig. 6 is very favorable to the efficient performance of the functions which it has long been sought to accomplish by means of rubber cushioning elements in spring shackle joints or the like, i. e. the cushioning road shocks, and vibration effects, insulating the parts to prevent tonal vibrations being communicated therebetween, holding the parts with sufficient rigidity against undesirable lateral movements as to prevent undue side-sway and "shimmy" effects, coupled with the quality longevity of useful performance. The shackle arms are of novel form, previously described, which is conducive to the securing of maximum strength with a minimum amount of material.

In Figs. 3 and 4 a spring joint is shown, in connection with a hanger construction, wherein hour-glass form of spring eye is employed in connection with a pair of inwardly tapered annular rubber cushioning elements substantially as shown in the shackle of Fig. 1, except that in the embodiment shown in Fig. 3 the spring bolt does not exert compressive stress upon the two arms of the hanger to tend to force them together, as is the case with the shackle arms of Fig. 1, but instead, the head of the bolt is substituted for one of the arms with respect to this function. The said bolt head, however, is slidingly fitted within the arm which is thus relieved from the compression function. In this manner I effect a novel method of interconnecting the spring eye with a hanger shown for the first time in my said copending application, but embodying the principles of the present invention in certain phases, previously related.

In the number of the illustrated embodiments I employ rubber washers such as those shown at 68 and 96 to trap the rubber material tending to flow out of the spring eyes during the rubber compressing operation and thereby put both the rubber washers and the material of the spring eye contained rubber body under compressive stresses which are equal and opposite and therefore balanced along their contacting surfaces.

I claim:

1. In a mechanical joint connector, the combination with a hanger, of a leaf spring comprising a leaf comprising a main portion of substantially flat form terminating in an integrally formed tubular terminal eye, the walls of the eye being circumferentially channeled, an element of mechanism projected substantially axially through said eye, and interposed cushioning means composed of rubber or like inherently resilient material disposed intermediate the interior walls of the eye and said mechanism element, the said cushioning means projecting a substantial distance from the said eye whereby compressive force may be exerted thereagainst by joint members disposed externally of the spring eye.

2. In a mechanical joint connector, the combination with a hanger of a leaf spring comprising a main portion of substantially flat form terminating in an integrally formed channeled eye, an element of mechanism projected substantially axially through said eye, cushioning means composed of rubber or like inherent resilient material disposed intermediate the interior walls of the eye and said mechanism element, and the said cushioning means being compressively confined at the ends thereof.

3. A vehicle body supporting main leaf spring for a laminated spring assembly comprising a main leaf portion substantially flat in transverse directions throughout a substantially working end portion, a spring eye element bent into tubular form formed integrally with said main spring portion and having circumferential channel-shaped walls, a root portion for said channel-shaped walls gradually merging with the said main spring portion and being of tapered channeled form and of decreasing depth proceeding in the direction away from said eye element.

4. The leaf spring substantially as set forth in claim 3 characterized by the walls of said eye element being channeled radially inwardly.

5. The leaf spring substantially as set forth in claim 3 characterized by the walls of said eye element being channeled radially outwardly.

OSCAR U. ZERK.